(12) United States Patent
Chang

(10) Patent No.: US 6,213,671 B1
(45) Date of Patent: Apr. 10, 2001

(54) ADJUSTABLE ARTICULATED POSITIONING DEVICE

(75) Inventor: Stacey Hsu-wen Chang, Chicago, IL (US)

(73) Assignee: BriteSmile, Inc., Walnut Creek, CA (US)

( * ) Notice: Subject to any disclaimer, the term of this patent is extended or adjusted under 35 U.S.C. 154(b) by 0 days.

(21) Appl. No.: 09/234,039

(22) Filed: Jan. 19, 1999

(51) Int. Cl.[7] ............................. F16C 11/00; F16D 13/30
(52) U.S. Cl. ............................. 403/84; 403/31; 403/145; 403/147; 248/278.1
(58) Field of Search ........................ 403/31, 145, 146, 403/147, 84, 91, 103; 463/110; 248/276.1, 278.1, 299.1

(56) References Cited

U.S. PATENT DOCUMENTS

| 3,072,374 | | 1/1963 | Bodian . | |
|---|---|---|---|---|
| 3,638,973 | * | 2/1972 | Poletti | 248/276 |
| 3,858,836 | | 1/1975 | Marcyan . | |
| 4,257,714 | * | 3/1981 | Hankosky et al. | 403/31 |
| 4,431,329 | | 2/1984 | Baitella . | |
| 4,517,632 | | 5/1985 | Roos . | |
| 4,639,158 | * | 1/1987 | Jones | 403/31 |
| 4,863,133 | * | 9/1989 | Bonnell | 248/278 |
| 5,284,130 | * | 2/1994 | Ratliff | 248/278 |
| 5,343,391 | | 8/1994 | Mushabac . | |
| 5,555,897 | | 9/1996 | Lathorp, Jr. et al. . | |
| 5,564,667 | | 10/1996 | Copeland et al. . | |
| 5,683,064 | | 11/1997 | Copeland et al. . | |
| 5,730,410 | | 3/1998 | Archambault et al. . | |
| 5,754,741 | | 5/1998 | Wang et al. . | |
| 5,779,209 | * | 7/1998 | Rello | 248/278.1 |
| 6,042,064 | * | 3/2000 | Hong | 248/278.1 |

* cited by examiner

Primary Examiner—Lynne H. Browne
Assistant Examiner—Kenneth Thompson
(74) Attorney, Agent, or Firm—Kalow & Springut LLP

(57) ABSTRACT

An adjustable articulated positioning device is disclosed which utilizes at least two air-controlled clutch hinges that may be simultaneously unlocked to allow rotation of the articulating members about each hinge.

6 Claims, 6 Drawing Sheets

ADJUSTABLE ARTICULATED POSITIONING DEVICE

BACKGROUND OF THE INVENTION

The present invention relates to a manually adjustable articulated positioning device having air driven clutch hinges between articulating members that may be used for adjusting and controlling the position of instruments held at the head-terminus end of such device. Such devices may be used, for example, in holding and positioning instruments and/or light sources used in medicine, dentistry, and other applications where adjustable positioning of such items is desired. The device according to the present invention allows for the instrument to be positioned in the elevation, extension, lateral position, orientation, and approach aspects relative to the fixed base of the device or the position of the target.

Various repositionable structures have been developed for making adjustments of tools, surgical instruments and the like. Typically, such structures have a plurality of articulated members or 'arms' that are coupled through various rotating devices so as to be relatively movable by either sliding or rotating relative to a fixed base structure or to one another.

The typical form of a repositionable structure takes the form of articulating arm members being joined by a hinged joint capable of being fixed by some means. For example, Baitelle in U.S. Pat. 4,431,329 shows a typical hinge locking mechanism that operates by friction comprising axially butting plates attached to respective articulating arm members; a threaded tightening bolt with a lever handle is used to bring and hold these plates into frictional engagement with each other thereby holding the articulating arm members in a fixed position. Copeland et. al., in U.S. Pat. 5,683,064 show articulating members coupled by rotational couplings on two mutually perpendicular axes thereby forming universal joints with axially-facing rotational surfaces; the rotational engagement surfaces are designed to resist rotation when engaged by use of a line such as a cable which traverses the joints (running centrally through the joints) and normally applies tension via a spring, causing all the joints to lock and to hold the end platform at a given position and orientation. A manually operable control is normally provided to extend the length of the line and disengage all the joints simultaneously, whereupon the support platform can be moved freely to a new position anywhere in a three dimensional range, as well as tilted, etc. The control is released at the new position to again hold the platform in place. Other cable-controlled positioning units are described by Rello in U.S. Pat. No. 5,779,209, and by Copeland et. al., in U.S. Pat. No. 5,564,667.

There are several drawbacks to frictional locking hinges as described by Baitelle. For example, if two or more rotational joints each lock separately and independently of each other, moving the support platform to a new position is cumbersome; for a series of rotational joints between articulated members, unlocking, moving the support platform to a new position and relocking each successive joint is tedious and makes it difficult to obtain the desired exact location for the support platform. In addition, such frictional locking hinges have the undesired tendency to slip if the threaded bolts holding the two opposing friction faces becomes loosened through changes in air temperature or lack of sufficient tightening. Likewise, there are several drawbacks to cable locking hinges as described by Copeland et. al, and Rello. For example, with cable systems the operator must have sufficient hand strength to operate the release and locking mechanism used to work the cable, there is the issue of cable wear over time, the issue of providing strengthened pulley points whenever the cable needs to be directed in other than a 180 degree angle (i.e., around any turn), and the issue of reinforced cable attachment points that will not yield or break when tension is constantly applied each time the cable is locked under tension or released under little or no tension.

Accordingly, while adjustable articulated positioning devices such as the positionable lights used in dentist operatories are commercially available, the need still exists for positioning devices that can be locked into positions more securely than those available presently, do not have the problems associated with cable tension and wear, do not need additional strength built into the device at cable attachment points, and do not need to be dependent upon the finger or hand strength of the operator to function properly.

SUMMARY OF THE INVENTION

The present invention addresses each of these needs by the use of unique air-activated clutches as the positioning hinges. The use of these hinges has several advantages over the friction and cable-controlled hinges used in presently available positioning devices. For example, with the hinges according to the present invention one can create significantly more force to unlock the hinges by using higher air pressure acting on large surface areas, meaning that the hinges may be frictionally locked and maintained in place using greater pressures provided by stronger springs than normally found used with hand-controlled bolt systems; the use of the hinges according to the present invention does away with the issue of cable wear and reinforced cable attachment points; operation of the positioning device according to the present invention can be accomplished with a single hand; and the use of air pressure avoids the design limitations placed upon a positioning system when the routing of cable systems is a concern.

Accordingly, it is one aspect of the present invention to describe an adjustable articulated positioning device for controlling the placement of an object within a desired spatial location.

It is another aspect of the present invention to describe an adjustable articulated positioning device for controlling the placement of an object within a desired spatial location which can be operated with ease by a single operator.

It is still another aspect of the present invention to describe an adjustable articulated positioning device for controlling the placement of an object within a desired spatial location which has air-controlled hinges located between articulating arms.

A more thorough and better understanding of these and other aspects and advantages of the adjustable articulated positioning device according to the present invention may be had by reference to the following description and accompanying drawings.

DETAILED DESCRIPTION OF PREFERRED EMBODIMENT

As used in the following description, the term "upstream" is meant to indicate a direction toward a source of pressurized air, and the term "downstream" is meant to indicate a direction away from a source of pressurized air.

Figure 1:
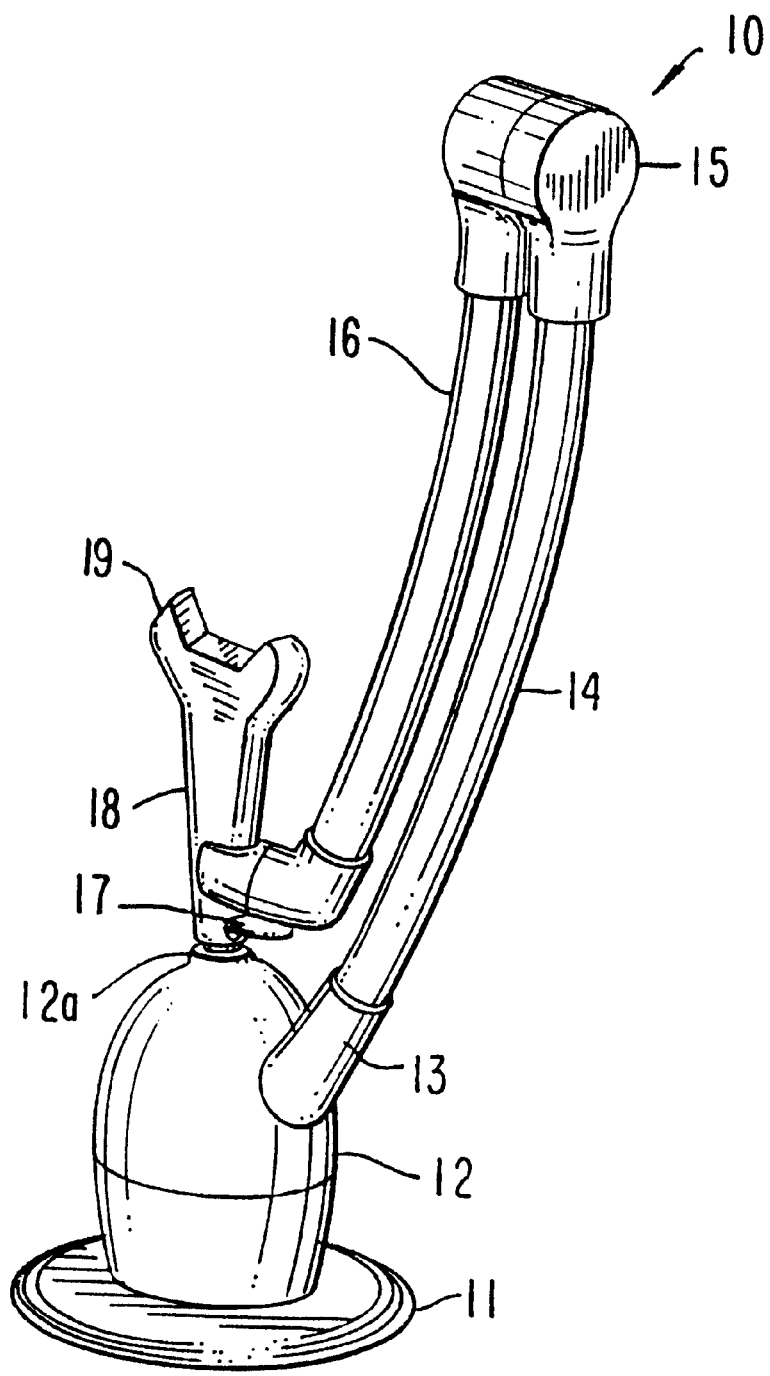
FIG. 1 depicts an over-all surface perspective view of the device according to the present invention.

More specifically, the adjustable positioning device 10 according to the present invention is depicted in FIG. 1 as comprising a base plate 11 adapted to fix and support the device to a surface (not shown); a pivotable base housing 12 that is rotatable about its longitudinal axis; a base hinge housing 13 that is rotatable about its juncture with the pivotable base housing 12 and which encloses a base hinge according to the present invention; a first articulating extension arm 14 extending between the base hinge housing 13 and a knuckle hinge housing 15 enclosing a knuckle hinge according to the present invention; a second articulating extension arm 16 extending between the knuckle hinge housing 15 and a head hinge housing 17 enclosing a head hinge according to the present invention; and a third articulating extension arm 18 extending between the head hinge housing 17 and terminating at an instrument holder 19 adapted to hold an instrument for use with the positioning device. Each axis of the hinge enclosed in the base hinge housing 13, the knuckle hinge housing 15, and the head hinge housing 17 is normal to the same plane thus allowing the extension arms to extend to their maximum length. Each arm extension is hollow, may be manufactured from metallic or polymeric stock, and carries within it the air lines and electrical lines necessary to utilize the present invention. Each hinge housing conventionally is designed to fit around the tubular extension arm (14, 16 and 18) to which it is attached. The pivot function of base housing 12 about its axis is completely independent of the three hinges according to the present invention that are enclosed in housings 13, 15 and 17. Whether the hinges are locked or unlocked as described below, base housing 12 can be pivoted about an axis normal to the base plate 11 of position device 10. This pivoting is accomplished by means of an axial shaft within base housing 12 that is attached directly to the inner surface of base 12 and is allowed to rotate within two bushings enabling the device to be positioned by both left-handed and right-handed operators. It also allows the operator to swing arms 14, 16, and 18 away from a desired position, for example the mouth of a dental patient, during a procedure and return it to the same position without the need to readjust the positions of the hinges within housings 13, 15, and 17. The downstream portion of the clutch hinge according to the present invention described more fully below is fixedly attached to extension arm 39.

Figure 2:
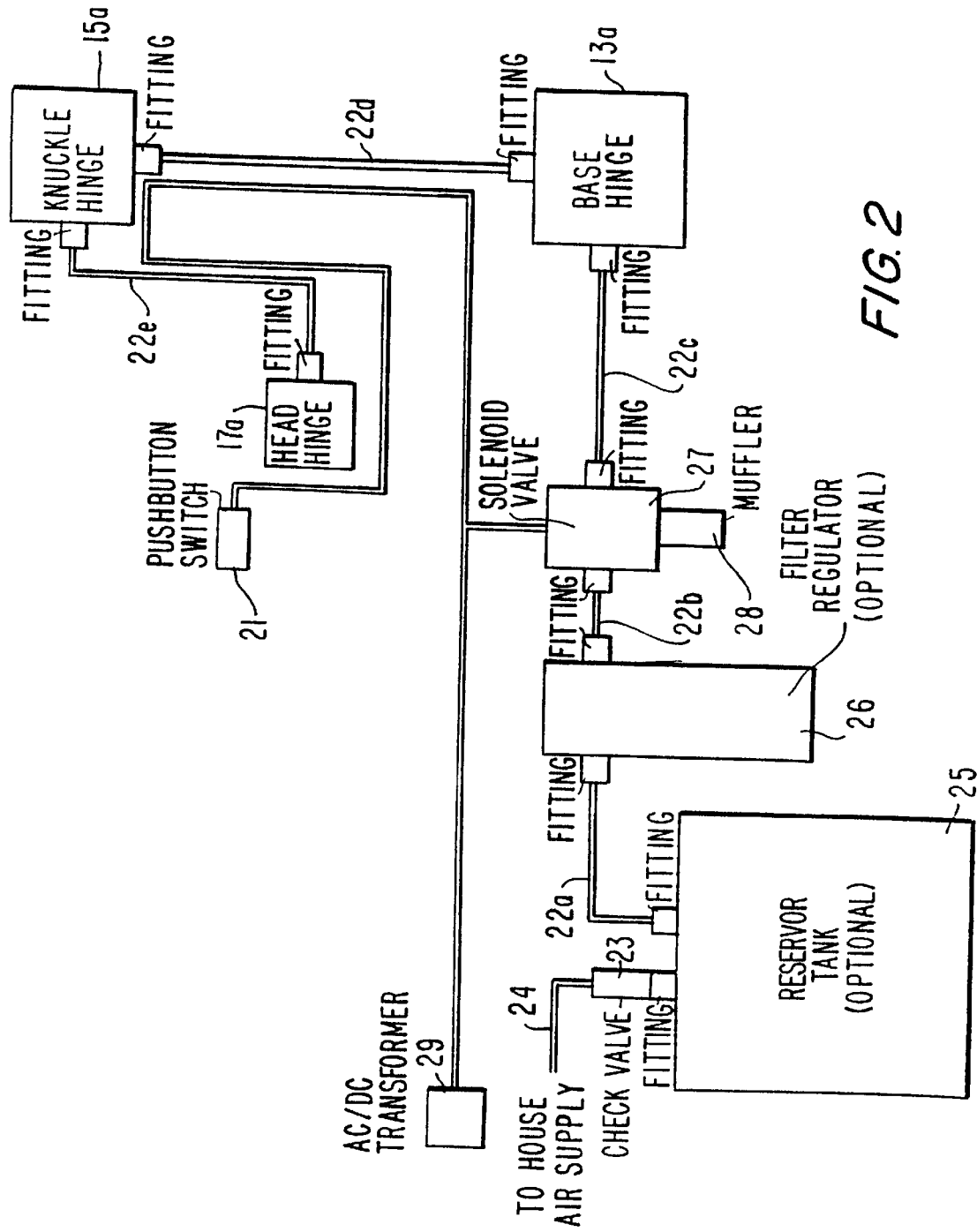
FIG. 2 is a block diagram of the device according to the present invention that depicts each of the major and ancillary units which allow the device to function.

With regard to FIG. 2, the positioning device 10 depicted in FIG. 1 is generally indicated by base hinge block 13a, knuckle hinge block 15a, and head hinge block 17a, each of which contain a hinge according to the present invention all of which operate on the basis of an air activated clutch. Thus, the device 10 according to the present invention requires an ancillary source of air pressure and means to provide this air pressure to the positioning device 10. Both the device according to the present invention and the ancillary units to operate this device are depicted in FIG. 2.

More specifically there is shown in FIG. 2 an air inlet supply hose 24 leading from a source of pressurized air which allows air to pass through a one-way check valve 23 and into air reservoir tank 25. As needed by the operator, air is removed under positive pressure from tank 25 through air line 22a and passes through an air filter and pressure regulator generally depicted at 26. Air reservoir tank 25 and pressure regulator 26 are optional, and not necessary if there is an adequate air supply. From the combination air filter and regulator shown at 26, the pressurized air next passes through air line 22b to a control valve 27. Preferably valve 27 is a solenoid valve that operates by electrical current from a power source 29, such as a low voltage AC/DC transformer, and is controlled by the operator by means of a manual switch 21. Valve 27 is designed so as to allow pressurized air to pass through the valve to the positioning device 10, to prevent pressurized air from exiting the valve, or to allow any pressurized air in device 10 to be "bled-off" or removed from the system through a muffler 28. When the operator places control valve 27 in the 'pass-through' position, pressurized air passes unimpeded through valve 27 through air line 22c, base hinge block 13a, air line 22d, knuckle hinge block 15a, air line 22e, and into head hinge block 17a of device 10. Since the unimpeded air pressure cannot exit device 10 until control valve 27 is in the 'bleed' position, back pressure will build up in device 10 resulting in each of the air-controlled hinges in hinge blocks 13a, 15a and 17a to be released allowing the extension arms 14, 16, and 18 to be rotated. Although not depicted in FIG. 2, both the electrical lines between switch 21 and power source 29, and the air lines extending from the head hinge block 17a and the base hinge block 13a, may be completely enclosed and hidden from view within extension arms 14 and 16.

Figure 3:
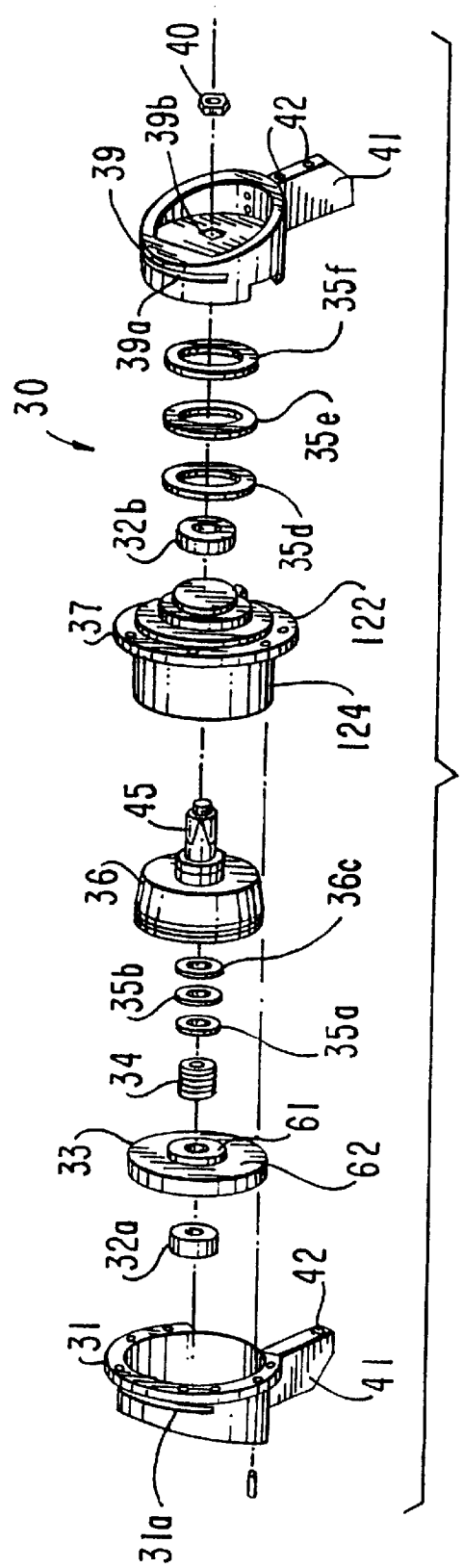
FIG. 3 depicts a three-quarters exploded perspective view of one air-activated clutch hinge assembly according to the present invention.

With regard to FIG. 3, there is depicted a three-quarter exploded view of one air-activated clutch hinge assembly 30 according to the present invention. In axial order, and extending from the downstream end of assembly 30 to the upstream end of assembly 30, there is located a downstream articulating arm attachment 31; a bushing 32a allowing for a rotational bearing surface; a clutch back plate 33; an expansion spring 34; needle bearings and washers 35a, 35b and 35c; clutch axle 36; clutch housing 37; bearing 32b allowing for a rotational bearing surface; needle bearings and washers 35d, 35e and 35f; a upstream articulating arm attachment 39; and female locking means 40. The upstream end of cylindrical shaft portion 45 may be manufactured to have a tapered square cross section as depicted, and in this instance opening 39b through which shaft portion 45 will extend when assembled may also be a tapered square-shape to aid in locking the upstream rotating units together. Not shown in FIG. 3 is an over-all encompassing hinge housing corresponding to those (13, 15 and 17) depicted in FIG. 1, however, it is clear that the such housings may be designed for their esthetic appearance and may be fitted, for example, snap-fitted about the articulating arm attachments 31 and 39 within, for example, a groove (31a and 39b) cut into the surface of attachments 31 and 39 at the time of their manufacture. In operation, the downstream arm attachment 31 and clutch housing 37 are fixed together and will rotate together when the assembly is activated by air pressure as described below; clutch axle 36 and upstream arm attachment 39 are also fixed together and will rotate together when the assembly is activated by air pressure as described below.

Figure 4:
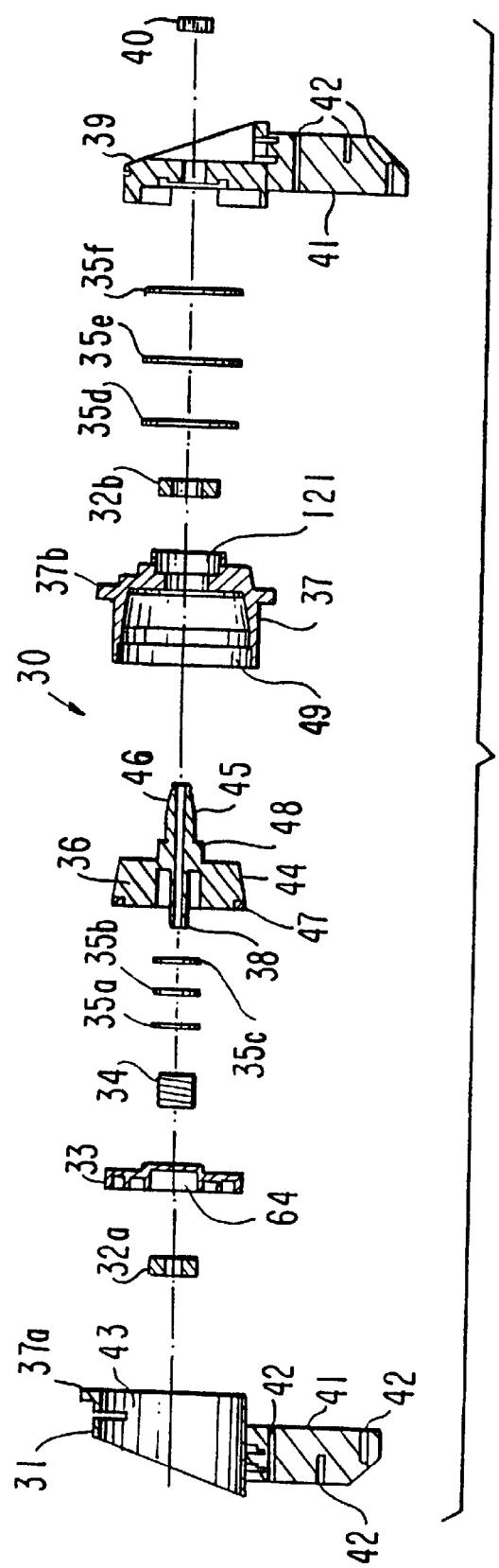
FIG. 4 depicts a longitudinal exploded cross-sectional view of the air-activated clutch hinge assembly according to the present invention as seen in FIG. 3.

With regard to FIG. 4, it will be seen that both the downstream arm attachment 31 and the upstream arm attachment 39 contain extensions 41, generally rectangular in cross-section as seen in FIG. 3, having openings 42 therein. These extensions 41 are designed so that articulating extension arm 14 (if assembly depicts knuckle hinge 15) may be slipped over upstream arm extension 41, and articulating extension arm 16 may be slipped over downstream arm extension 41. Once slipped over their respective arm extensions, extension arms 14 and 16 are then firmly fixed into position by passing screws or bolts through the arms and into or through openings 42. As seen in FIG. 4, downstream arm attachment 31 has a central opening 43 passing there through of sufficient interior diameter to correspond to the outer diameter of clutch housing 37 when inserted therein, thereby allowing flange A to be fastened to flange 37b with threaded fasteners or equivalent when clutch housing 37 and opening 43 are assembled. Clutch axle 36 is also seen to comprise a downstream upstream-facing truncated conical portion 44 and an upstream tapered shaft portion 45 of smaller outer diameter than portion 44. Both portions 44 and 45 include a O-ring (47 and 48, respectively) along their outer diameters to act as an air seal when the clutch hinge is assembled. The upstream terminus 46 of shaft portion 45 is adapted to be a male extension to pass through central openings in housing 37, bearings and washers 35d, 35e and 35f, upstream arm attachment 39, and locking means 40 and to fit into a locking engagement with locking means 40 thereby holding clutch axle 36, bearing 32b, needle bearings and washers 35d, 35e and 35f; upstream arm attachment 39, and locking means 40 together as a single rotatable unit within clutch housing 37. In addition, downstream arm attachment 31 and clutch housing 37 are fixed together to rotate as a single rotatable unit. Thus, downstream extension arm attachment 31 and upstream extension arm attachment 39 are free to rotate about the longitudinal axis extending through each other when no friction lock between clutch axle 36 and clutch housing 37 is present.

Figure 5:
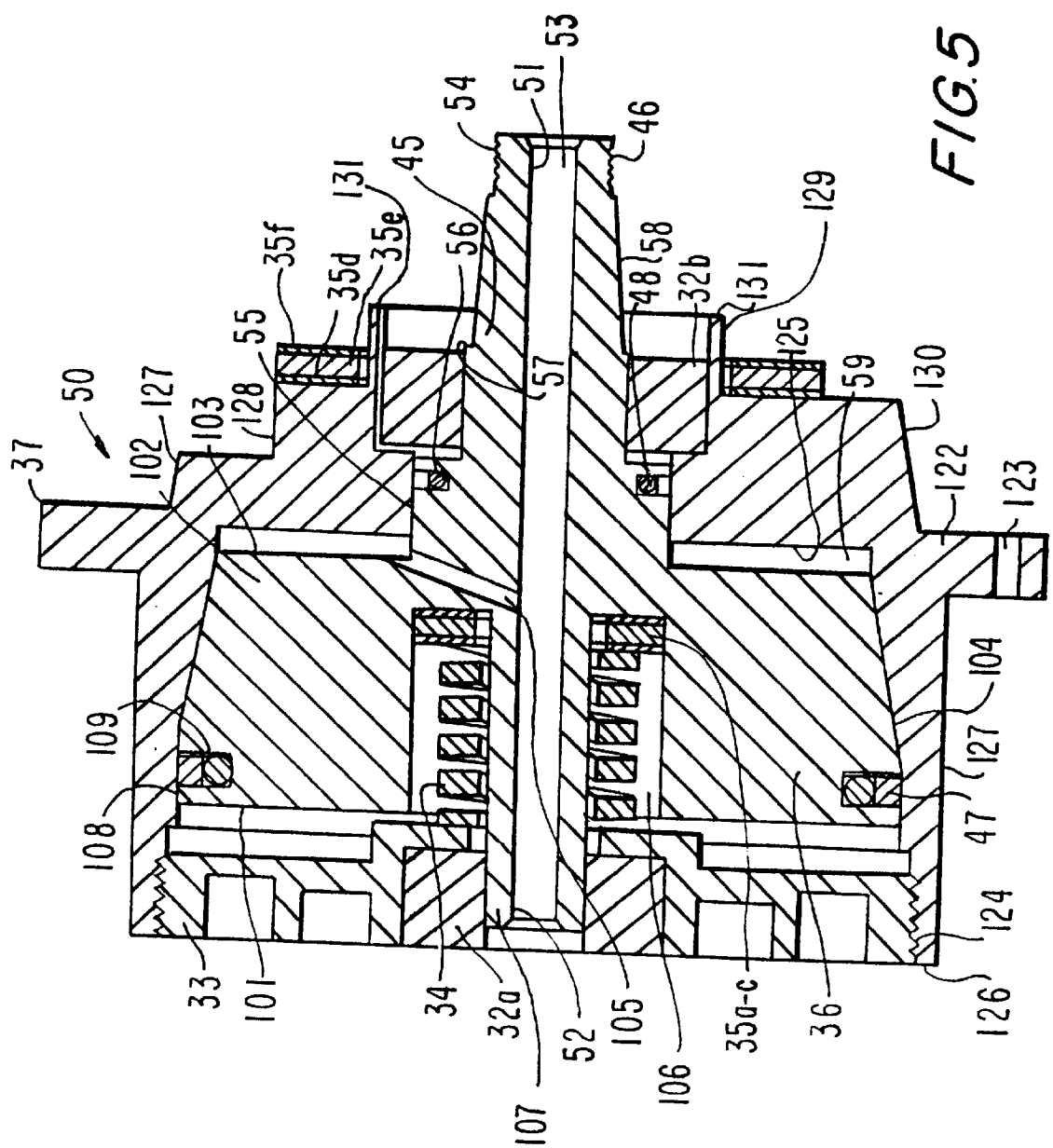
FIG. 5 depicts a cross-sectional view of the assembled air-activated clutch according to the present invention as generally seen in FIG. 4.

With regard to FIG. 5, there is generally shown an assembled air activated hinge 50 having clutch housing 37 and clutch axle 36 in place and in the locked, i.e., not rotatable, position. With specific regard to clutch axle 36, it is seen that it contains a longitudinal cylindrical bore 53 extending there through from the upstream terminus 46 of shaft portion 45 to the downstream terminus 38 of clutch axle 36. The inner upstream portion 51 and inner downstream portion 52 of bore 53 is conventionally threaded (not shown) to accept a male threaded air line (not shown), although other means of attaching air lines to both termini (38 and 46) of clutch axle 36 may be used. As shown, shaft portion 45 comprises a first cylindrical section 55 having an outer circumferential diameter generally equal to the interior diameter of the central opening 121 contained in clutch housing 37. In addition, first cylindrical section 55 contains an indention 56 for containing O-ring 48 to provide an air seal between the inner diameter of central opening 121 within the clutch housing 37 and the outer diameter of first cylindrical section 55. A second cylindrical section 57 having an outer circumferential diameter less than the first cylindrical section 55 is located upstream of said first section 55. The outer diameter of section 57 is manufactured to generally equal the inner diameter of bushing 32b and to have a longitudinal length which exceeds the width of bushing 32b. A forward-tapering section 58 is located upstream of section 57 and terminates in a third cylindrical section 54 extending to the upstream terminus 46 of shaft portion 45. Section 54 is the male terminus of shaft 45 to which female locking means 40 is attached, and although generally cylindrical in cross-sectional shape, section 54 may be threaded or manufactured to other shapes so as to fit and lock with locking means 40. Thus, shaft portion 45 comprises approximately the upstream half or clutch axle 36.

The downstream upstream-facing truncated conical portion 44 of clutch axle 36 is defined by that portion extending longitudinally between the most downstream surface 101 of portion 44, including the downstream terminus 38 portion of clutch axle 36, and the most upstream surface 103 of main conical body 102. The juncture of surface 103 with first cylindrical section 55 is at right angle to the longitudinal axis of clutch axle. At least one bore 105, in diameter less than bore 53, is located at this juncture and extends from this juncture to a point within bore 53 that is downstream of a plane extending along the front surface 103 of portion 44. Bore 53, which together with the width of its surrounding cylindrical extension 107 has an outer diameter that generally approximates the interior diameters of coaxially-aligned spring 34 and bearings and washers 35a, 35b and 35c, and extends downstream from bore 105 to downstream terminus 38 extending downstream from a plane extending along the downstream surface 101 of portion 44. Thus, bore 53 is longitudinally longer than the longitudinal distance between a plane passing along the surface of upstream terminus 46 and a plane passing along the downstream surface 101 of body 102.

Body 102 and the outer circumference of extension 107 are separate by a chamber 106 coaxial with extension 107 extending upstream from the downstream surface 102 of body 102 and terminating at a point prior to intersection with bore 105. Chamber 106 is defined by an inner diameter surface corresponding to the outer diameter of extension 107, and an outer diameter surface generally corresponding to the outer diameter of bearings and washers 35a, 35b, and 35c. Thus, when assembled, spring 34 and bearings and washers 35a, 35b and 35c will seat themselves about extension 107 and within chamber 106.

Upstream from surface 101, body 102 comprises a surface portion 108 having the greatest outer diameter of body 102, and extending longitudinally upstream of said downstream surface 101 a sufficient distance to have a indention 109 therein extending about the circumference of said surface 108 for placement of an air-sealing O-ring 47. Adjacent surface portion 108, body 102 is upstream-truncated (i.e., truncated towards the longitudinal axis of said clutch 36) to form a clutch surface 44 that terminates at surface its juncture with surface 103.

Exteriorly, clutch housing 37 has an open cup-like body having an interior chamber 49 defined by the interior longitudinal housing wall and its upstream surface 125 with the central opening 121. From the downstream terminus 126 or "lip", housing 37 appears as a longitudinally-extending cylindrical body 127 terminating in a outwardly and radially-extending annular ring 122 which has at least one bore 123 extending there through for aid in attaching one extension arm (such as arm 14 or 16) to housing 37. Upstream of ring 122 is a series of one or more stepped surfaces 127, 128, 129, and 130 each upstream stepped surface having an outer diameter of lesser dimension than its preceding downstream stepped surface, and terminating in a cylindrical upstream-most terminus 131 about bore 53. The outer diameter of terminus 131 is equal to the inner diameter of bearings and washers 35d, 35e and 35f, and the inner diameter of terminus 131 is equal to the outer diameter of bearing 32b.

The interior diameter of chamber 49 decreases in four incremental steps towards upstream surface 125. From the downstream to upstream direction, the first incremental step is a coaxial longitudinally extending diameter generally equal to the outer diameter of circular back plate 33; the second incremental step is a coaxial longitudinally extending diameter generally equal to the outer diameter of body 102 at surface portion 108; the third incremental step is a sloped surface 104 that corresponds to the slope of the conical surface 44 of body 102 (i.e., surface 104 and 44 will abut each other along their respective lengths when body 102 is placed in contact with the interior of housing 37); and a fourth incremental step which is a axial longitudinally extending diameter whose inner diameter corresponds to the diameter of surface 103. When assembled, the surface corresponding to the cylindrical length of the fourth incremental step, surface 125, and surface 103 form a chamber 59. Chamber 59 is coexistent with bore 53 through bore 105.

Figure 6:
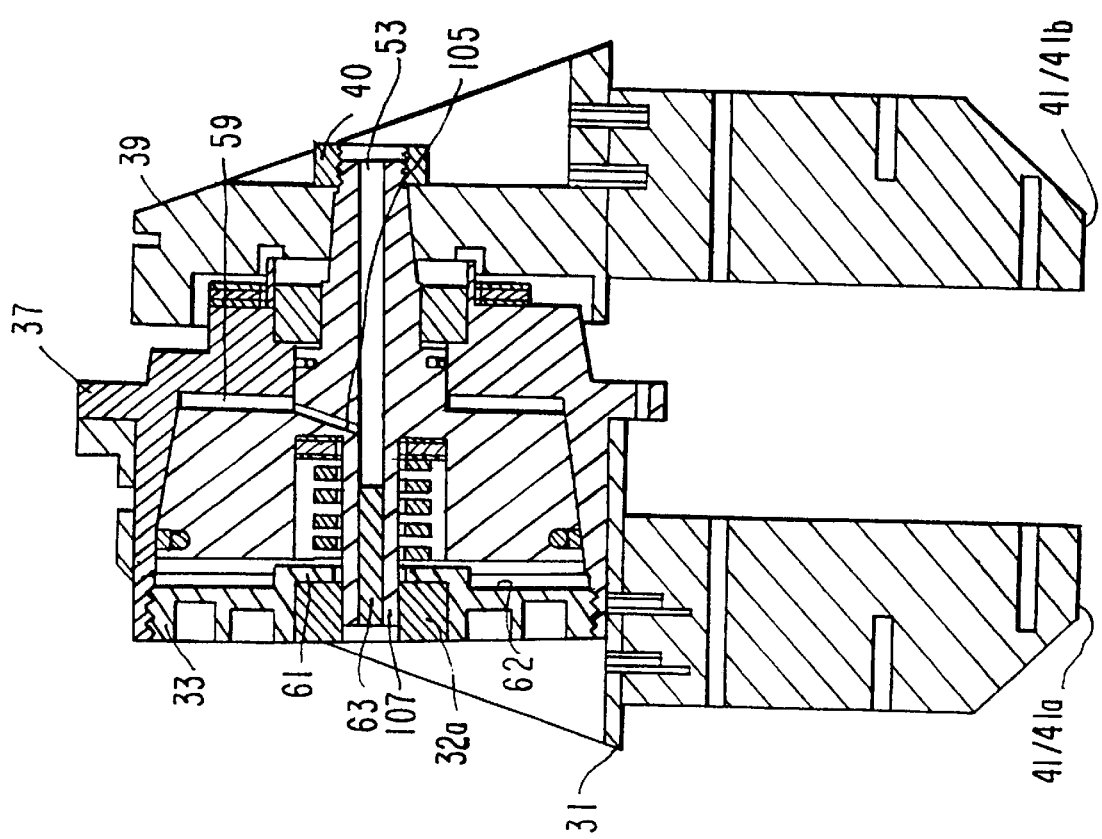
FIG. 6 depicts a cross-sectional view of a cross-sectional view of the assembled air-activated clutch hinge according to the present invention.

With regard to FIG. 6, there is generally depicted an air-activated clutch hinge assembly according to the present invention as seen in FIGS. 3–5. However, whereas FIGS. 3–5 depicts a clutch axle 36 as would appear in base hinge 13 or knuckle hinge 15, FIG. 6 specifically depicts the clutch axle that would be found in head hinge 17. This is because bore 53 does not extend totally though clutch axle 36 in the head hinge. As depicted, in head hinge 17, bore 53 terminates downstream from bore 105 by a block 63 which may be a plug inserted into bore 53 or a failure of bore 53 to be extended throughout clutch axle 36 at the time of axle manufacture. This is the only difference in components located between bearing 32a and means 40 as shown in FIG. 4 for the base (13) and knuckle (15) hinges, and components found in head hinge 17 (differences may or may not exist between the downstream articulating arm extension 31 found in head hinge 17 and the base (13) and knuckle (15) hinges as discussed below).

Also shown in detail in FIG. 6 is the back plate 33 which is shown to have a first upstream surface 62; a second, central circular upstream surface 61 elevated as to the plane of the first surface 62; and a central circular opening to allow extension 107 to pass therethrough. In addition the downstream surface of back plate 33 contains a central axial circular opening 64 having an inner diameter corresponding to the outer diameter of bearing 32a. As shown in FIG. 6, downstream extension 41/41a will be inserted and fixed within extension 18 and extension 41/41b will be inserted and fixed within extension 16 as shown in FIG. 1; alternatively, when additional extension between head hinge 17 and instrument holder 19 is not necessary or desired, articulating arm extension 31 may then be either directly attached to instrument holder 19 by attachment of holder 19 to extension 41/41a, may be manufactured so as to incorporate instrument holder 19 as an intimate part of extension 31, or extension 31 may be replaced in toto by replacing extension 31 with instrument holder 19 which comprises a body generally similar in shape to extension 31 but with 41/41a being instrument holder 19 as depicted in FIG. 1 rather than a extension for connection to instrument holder 19 either directly or through an additional arm 18.

In assembling the air activated hinge 50 according to the present invention, bearings and washers 35a, 35b and 35c are placed into chamber 106 and thus around extension 107, followed by extension spring 34. Bearing 32b is inserted into central opening 121 of clutch housing 37, and clutch axle 36 is then inserted into housing opening 49 with the shaft portion 45 extending through opening 121 and bearing 32b. Bearing 32a is placed within opening 64 and back plate 33 is then inserted and fixed into opening 49 by screw threads. The remaining bearings, washers, downstream and upstream arm attachments are attached; and the appropriate hollow extension arms are slipped over and affixed to the extensions carried by each arm attachment. Hinge housings (13, 15 and 17) as shown in FIG. 1 are then placed over each hinge to hide the hinge, protect it from dust and other abrasive particles that might be in the environment, and to make the overall appearance of the positioning device more appealing to the eye. At this point, extension spring 34 forces clutch surface 44 to lock in a non-rotatable position i.e., the exterior surface of the clutch axle and interior surface of the axle housing for each of the three hinges (base, knuckle, and head) will be in intimate contact with each other.

As depicted in FIG. 2, when assembled an air line (for example line 22d passing through hollow arm 14) will exit the downstream opening of bore 53 at extension 107 in hinge assembly 50, and enter the upstream opening of bore 53 of shaft portion 45. Any pressurized air introduced into the assembled system will be free to pass through valve 27 and base (block 13a) and knuckle (block 15a) hinges until it reaches block 63 bore 53 located in the head (block 17a, and FIG. 6) hinge. Since air cannot escape from the head hinge depicted in FIG. 6, a back pressure will occur and air will escape from bore 53 of each hinge, through bore 105, to chamber 59 located in each hinge. Once in chamber 59 the air pressure applied to surface 103 of body 102 will cause spring 34 in each hinge to compress, each axle 36 to move downstream, and to release the friction-fitting surface of body 102 away from housing surface 104 at clutch surface 44. Each hinge will release at the same moment allowing total movement of the positioning device. Once released, the operator will be able to rotate clutch axle 36 and arm attachment 39 freely about clutch housing 37 and arm attachment 31 to horizontally and vertically position the instrument holder 19 and whatever is contained therein in a desired position. Once the instrument holder 19 is placed in the desired position, switch 21 is deactivated to stop pressurized air from passing through valve 27 and the pressure is released from the hinges and lines by passing out of the device through muffler 28. This results in each expansion spring 34 expanding to force body 102 and housing surface 102 to come into friction-fit alignment at clutch surface 44, thereby locking the arms and hinges in place.

Thus, while we have illustrated and described the preferred embodiment of our invention, it is to be understood that this invention is capable of variation and modification, and we therefore do not wish or intend to be limited to the precise terms set forth, but desire and intend to avail ourselves of such changes and modifications which may be made for adapting the present invention to various usage's and conditions. For example, if desired, more than one knuckle hinge body may be used with additional articulating extension arms for positioning the instrument holder at increased vertical and/or horizontal distances from the base of the device; and although it is preferred that switch 21 be at or near the head hinge for ease of use, switch 21 may be located at any convenient site in proximity to the operator. Accordingly, such changes and modifications are properly intended to be within the full range of equivalents, and therefore within the purview of the following claims. The terms and expressions which have been employed in the foregoing specification are used as terms of description and not of limitation, and thus there is no intention, in the use of such terms and expressions, of excluding equivalents of the features shown and described, or portions thereof, the scope of the invention being defined and limited only by the claims which follow.

Having thus described the invention and the manner and process of making and using it in such full, clear, concise, and exact terms so as to enable any person skilled in the art to which it pertains, or with which it is most nearly connected, to make and use the same.

What is claimed is:

1. An adjustable articulated positioning device having a base; a series of two or more articulating arms; a hinge positioned at the juncture of said base with the first of said arms; and a hinge positioned at the juncture of each successive articulating arm in said series; said hinge comprising a clutch housing portion, a clutch axle portion, and a spring; and wherein said clutch axle portion is engaged with the spring and said clutch axle portion comprising a truncated conical portion and a tapered shaft portion; and wherein said clutch axle and clutch housing portions form a conical friction-fitted surface.

2. An adjustable articulated positioning device according to claim 1 wherein each hinge in said series is simultaneously air-activated from a first fixed and locked position to a second released and rotatable position.

3. A rotatable hinge body comprising a clutch housing portion a clutch axle portion, and a spring, said clutch housing portion, said clutch axle portion and said spring are all positioned about a common coaxial longitudinal axis; and wherein said clutch axle portion is engaged with the spring and said clutch axle portion comprising a truncated conical portion and a tapered shaft portion; and wherein said clutch axle and clutch housing portions form a conical friction-fitted surface;

wherein said clutch axle portion is longitudinally moveable from a first position in fixed and locked relation to said clutch housing portion to a second position in released and rotatable relation about said common coaxial longitudinal axis; and wherein said clutch axle portion is disengaged from said clutch housing portion by compressing said spring with an increase in air pressure within a chamber located between said clutch housing and said clutch axle portion to provide said longitudinal movement of said clutch axle portion.

4. A method for positioning an instrument in space comprising:

(a) providing an adjustable articulated positioning device having a base; a series of two or more articulating arms extending from said base; a hinge positioned at the juncture of said base with the first of said arms; and a hinge positioned at the juncture of each successive articulating arm in said series; said hinge comprising a clutch housing portion, a clutch axle portion, and a spring; and wherein said clutch axle portion is engaged with the spring and said clutch axle portion comprising a truncated conical portion and a tapered shaft portion; and wherein said clutch axle and clutch housing portions form a conical friction-fitted surface;

(b) releasing each of said hinges simultaneously from a locked position to a rotatable position;

(c) moving said arms in said series to a position where said instrument is positioned in a desired spatial location; and (d) locking each of said hinges simultaneously to retain said instrument in a fixed position at the desired spatial location.

5. An articulated positioning device comprising a rotatable hinge body according to claim 3.

6. The method according to claim 4 further comprising releasing said instrument by activating a switch positioned on the last of said arms in said series.

* * * * *